F. P. E. CARRE & E. JULLIEN.
REFRIGERATING APPARATUS.

No. 187,354. Patented Feb. 13, 1877.

F. P. E. CARRE & E. JULLIEN.
REFRIGERATING APPARATUS.

No. 187,354. Patented Feb. 13, 1877.

Witnesses:
Geo. H. Graham
S. M. Pool

Inventor
F. P. E. Carré
and
E. Jullien by Munson
Philipp
Attorneys.

F. P. E. CARRE & E. JULLIEN.
REFRIGERATING APPARATUS.

No. 187,354. Patented Feb. 13, 1877.

Witnesses:
Geo. A. Graham
S. M. Poole

Inventors.
F. P. E. Carré and E. Jullien.
by Munson & Philipp.
Attorneys.

UNITED STATES PATENT OFFICE.

FERDINAND P. E. CARRÉ AND EDOUARD JULLIEN, OF PARIS, FRANCE.

IMPROVEMENT IN REFRIGERATING APPARATUS.

Specification forming part of Letters Patent No. 187,354, dated February 13, 1877; application filed November 3, 1876.

*To all whom it may concern:*

Be it known that we, FERDINAND PHILIPPE EDOUARD CARRÉ, and EDOUARD JULLIEN, of Paris, France, have invented certain new and useful Improvements in Refrigerating, and in the Apparatus therefor; and we do hereby declare the following to be a full, clear, and exact description of the same, reference being had to the accompanying drawings, forming a part thereof.

The general principles of ammoniacal refrigerating apparatus, and their action, are now so well and universally known that we can dispense with a general description thereof; and we, therefore, confine ourselves to the description of our improvements which cause them to work much more efficaciously under all conditions, and permit the obtainment of important results from their different applications.

Our invention consists in such improvements more fully hereinafter described and and claimed.

Figures 1, 2:
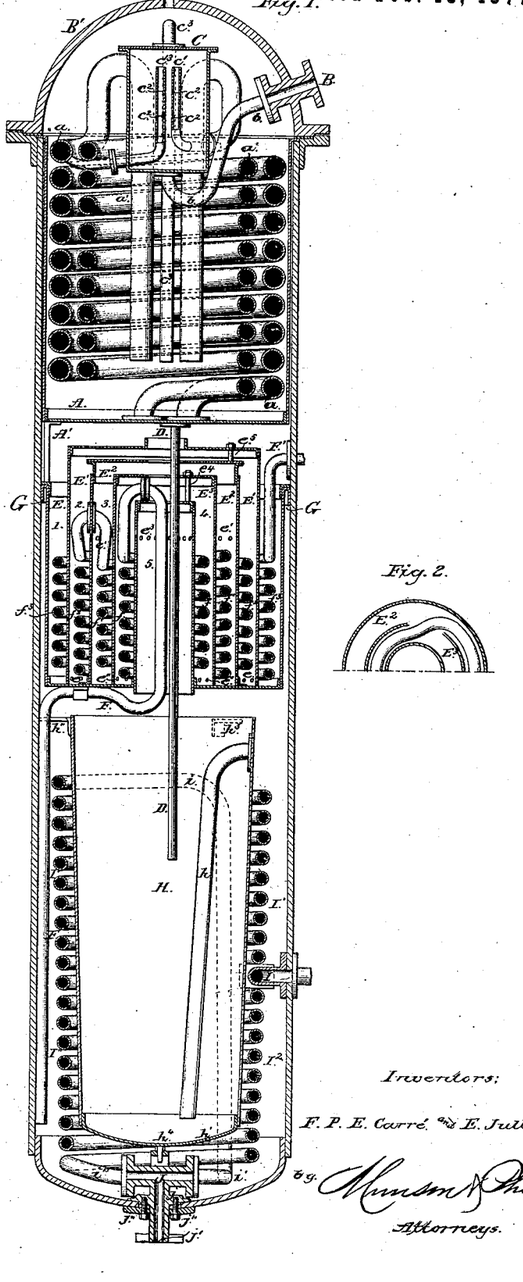

*The Boiler.*—The boiler shown in Figure 1 of the drawings is the vessel in which the water holding the ammonia in solution is heated in order to drive off the gas, which is afterward condensed for the subsequent operations. Water charged with ammonia enters the boiler at B, passes into the rectifier, and in its passage through the rectifier to the exchanger of temperature comes in contact with the ammoniacal gas, and abstracts therefrom a portion of the heat contained therein, and any aqueous vapor held therein. On its passage through the exchanger of temperature it still is brought into contact with the heated gas, and with the coiled pipes in the exchanger, through which the spent liquor is passing, to be cooled, and to re-absorb the gas. By this contact with the heated gases and pipes the liquor is brought into the boiler proper at a high temperature, and the gases and spent liquor are materially cooled.

We shall now proceed to describe in detail a boiler of our invention, as shown in Fig. 1, capable of producing one hundred kilograms of ice per hour.

The rectifier therein is constructed of a tube, A, formed of two serpentines, $a$ $a^1$, in which the liquid, proceeding from the feed-pump by the tube B and bent pipe $b$, is distributed by the distributer C. The latter is provided with two vertical pipes $c$ $c^1$, the first, $c^{13}$, having two holes, $c^2$, five millimeters in diameter, by which the liquid enters the serpentine $a$, and the second, $c^1$, has two holes, $c^2$, opposite and at the same height of four and three-tenths millimeters diameter, by which the liquid flows to the serpentine $a^1$. The tube $c^3$ maintains the pressure of the distributer *in equilibrio* with that of the boiler. The serpentines $a$ $a^1$ rise up from the point of admission of the liquid, and are carried back again nearly down to the arm of the rectifier in order to remove therefrom any liquid that may be projected accidentally. The envelope or casing of the serpentines is inclosed, its upper flange being fixed in the joint of the boiler, the serpentines being bolted to the bottom, a space being left between its circumference and the boiler. The pipe D, placed near the center, returns to the lower portion of the boiler the liquid which may have been projected. The rectification of the gas which rises in the serpentines is effected by contact with the liquid which descends, the steam in becoming condensed disengaging its equivalent of ammoniacal gas. At the end of the rectifier there is an exchanger of temperature of the exhausted and saturated liquid. The liquid which falls from the rectifying-serpentines falls into the exterior annular vessel E, whence it rises again by the holes $e$, pierced in the circumference of the ring 2, and flows out by the holes $e^1$, of the ring 3, and so on into that which brings it through the holes $e^2$ to those, $e^3$, of the central ring 5. After having successively passed through the annular vessels or rings E E¹ E² E³, the spent liquid re-ascends by the tube F, which passes down to nearly the bottom of the boiler in a direction opposite to that of the liquid in the annular vessels by means of the serpentines $f$ $f^1$ $f^2$ $f^3$, and escapes by the tube F¹. The rings 1, 3, and 5 are riveted on the bottom, and the rings 4 and 2 are movable, the covers of the movable rings being bolted, each by three or four stays, $e^4$ $e^5$, to the covers of the fixed rings. The cover of the fixed ring 3 is bolted with india-rubber onto a flange, and must be raised up for the introduction of the serpentines and the movable ring 4. Each cover has an opening in the middle for the passage of the gases and the tubes D F. The upper edge of the ring 1 is pressed on the flange G by means of four appendages, $a^1$, a piece of india-rubber being interposed.

Fig. 2 shows the passage of the serpentine from the annular vessel $E^2$ to the annular vessel $E^3$, the same arrangement being employed between the vessels E $E^1$. In the lower part of the boiler is placed a receiver, H, into which flows the liquid from the exchanger.

It is heated as in a bath by the liquid which surrounds it, which is warmer by reason of its expansion. The overflow runs off gradually by the tube $h$, extending from the bottom, the latter being pierced with a small hole, $h^1$, to allow the receiver to empty itself when the ammonia is removed from the boiler. $h^2$, $h^3$, and $h^4$ are stays which hold the receiver.

When the heating is effected by steam it distributes itself by the double pipe I into the serpentines $I^1 I^2$, the former being curved at $i$, in order to join $i^1$ to the exit-pipe J, the latter joining it at $i^2$.

The joint of this tube to the wall of the boiler is so arranged as to be very solid.

The flange $j$ is fixed by the bolts, which do not pass through it. A projection on the flange enters a hole in the boiler and is bedded in india-rubber, and the external tube $j^1$ is provided with a screwed flange, which is movable, to allow the passage of the washer $j^2$, against which the bolts are secured.

The cover of the boiler should be provided with a man-hole, $B^1$. The heating by the open fire is effected in the usual manner.

Figures 3, 4, 5:
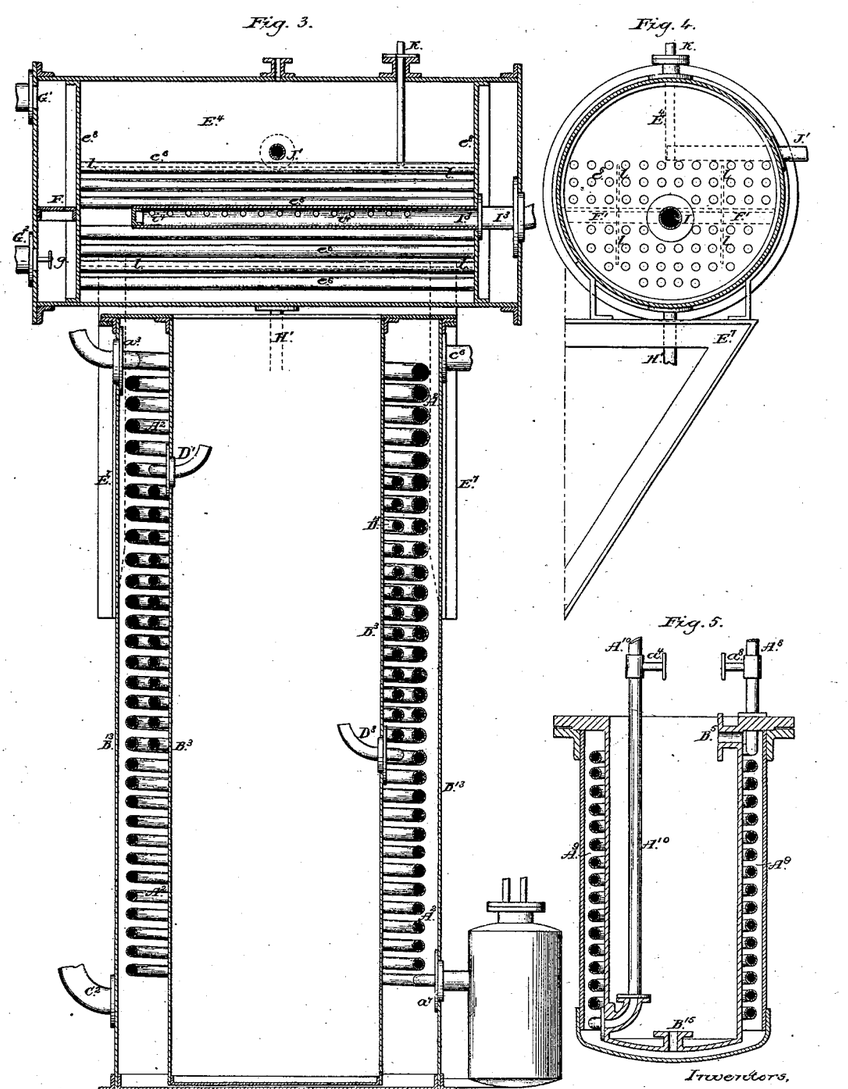

*Liquefier and Absorption-Vessel.*—The liquefier and absorption-vessel shown in Figs. 3 and 4 of the drawings is the apparatus in which the gas is condensed and liquefied preparatory to being used in the refrigerator, and in which the gas after having been used in the refrigerator is absorbed by the impoverished liquid from the boiler.

The gas generated in the boiler passes through a serpentine, $A^2$, located in an annular closed vessel, $B^3$, through which the refrigerating-water is caused to flow, in which it is liquefied for subsequent use in the refrigerator.

The impoverished liquid, after passing through the exchanger of temperature, enters a coil of pipes, $D^{13}$, also placed within the annular vessel $B^{13}$, and is there more effectually cooled preparatory to entering the absorption-vessel.

The gas, after being used in the refrigerator, enters the absorption-vessel $E^4$, in which the impoverished liquid also enters through the pipe $H'$, water passing through tubes in the vessel to cool the contents of the latter.

We shall now proceed to describe in detail the liquefier and absorption-vessel of our invention, as shown in Figs. 3 and 4.

The liquefier is formed of a serpentine, $A^2$, of a decreasing section, placed within an annular closed vessel, $B^{13}$, the cover of which is movable, and carries an internal appendage, $B^3$, and is bolted onto the flange of the casing.

The flanges $a^3$ $a^7$ of the serpentine are very wide, and are bolted by their outer edge to the casing, and the flanges of the tubes for the admission of the gas and the exit of the liquefied gas are bolted directly to the center of these wide flanges, which greatly assist the joint in bearing the pressure.

$c^2$ $c^6$ are the tubes for the entrance and exit of the refrigerating-water, inclined at an angle to the radius, so as to give a gyratory movement, which assists the operation. For economy of construction the serpentine for the additional cooling of the impoverished liquid after the exchange of temperature is placed in the same vessel at $D^1$ $D^3$.

The absorption-vessel $E^4$ is carried by brackets $E^7$ riveted to the two sides of the casing of the liquefier. It is composed of a cluster of tubes, $e^6$, riveted or soldered to plates $e^8$ divided into two portions by the partition $F^1$. The water enters by the tube $G^2$ and passes out by the tube $G^1$. In front of the former is a small disk, $g$, which breaks the current and regulates the circulation. The tube $G^1$ should be above the level of the upper tubes, in order to preserve a constant level, and the siphon effect is prevented by a small bent tube about one meter high placed at the summit of the elbow. $H'$ is the entrance-tube for the impoverished liquid. $I^3$ is the tube for carrying off the gas, pierced with fifteen holes, $i^4$, of seven millimeters diameter on each of its sides. $J^1$ is a cleansing-pipe for the liquefier. K is a cleaning-pipe for the absorption-vessel. $l$, diaphragms which regulate the current of the absorbing-liquid.

*Supplementary Exchanger.*—Fig. 5 is a supplementary exchanger, analogous as to its construction to those heretofore employed, but of a reduced surface and not intended to carry the saturated liquid to the point of ebullition. The tube $A^8$ carries off the liquid from the exchanger of the boiler to the internal serpentine $A^9$. It passes thence by the tube $A^{10}$ into the absorption-vessel by means of the complementary cooling-serpentine $D^{13}$ placed in the liquefier, Fig. 3. These two tubes may communicate with each other above the exchanger by the small tubes $a^4$ $a^5$, between which is a tap, which should be so worked as to prevent too great an alleviation of temperature of the saturated liquid, which would be prejudicial to a proper rectification in the boiler. When entirely closed it forces all the hot current to pass into the serpentine. When more or less open it determines the deviation from the tube $A^8$ to the tube $A^{10}$, and according as the deviation should be more or less the saturated liquid will be heated more or less. It will be readily perceived when it arrives at the boiling-point by the trepidation which it imparts to the receiver. The saturated liquid enters by the tube $B^{15}$ and passes out by the tube $B^5$.

*Refrigerator.*—The refrigerator, various forms of which are shown in Sheets 3, 4, and 5 of the drawings, is the apparatus in which the gas is caused to operate upon the liquid or other material intended to be cooled or frozen. The liquefied gas enters the apparatus, and after performing its duty passes vaporized into the absorption-vessel, where it is absorbed by the impoverished liquid and thence taken back to the boiler.

Figure 6:
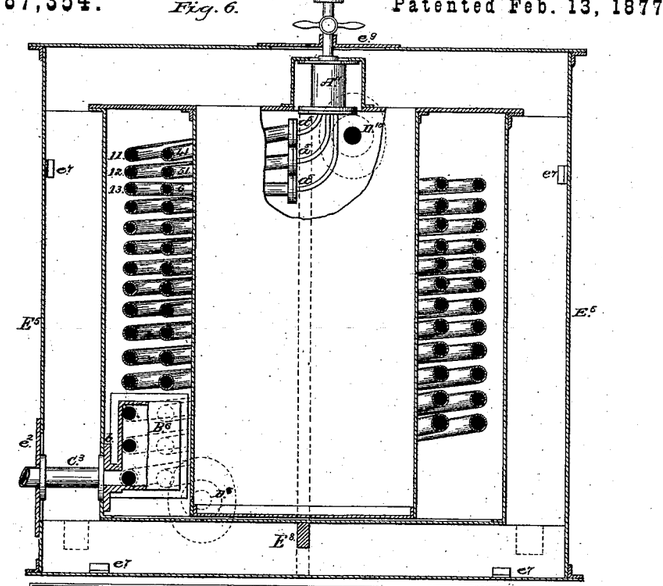

Fig. 6, Sheet 3, shows an annular refrigerator with a closed casing, serving for the refrigeration of uncongealable liquids. It is formed of six serpentines, 11 12 13 41 51 6, receiving the liquefied gas from the distributer $A^{11}$, similar to those of the ordinary apparatus, by six small tubes, $a^5$, the serpentines opening into a cast-iron collector, $B^6$, on which they are fixed by rectangular flanges, bolted by their angles in order to economize space. The flange $b^4$ of the collector is bolted by its edge to the casing, and receives at its center the flange of the tube $C^3$, which leads to the absorber. $D^5$ $D^{10}$ are tubes for the entrance and exit of the liquid to be cooled, which are placed at an inclination to the radius, as before mentioned, for the circulation of the liquefier.

The refrigerator is surrounded by non-conducting matters and inclosed in a tight casing of sheet-iron, $E^5$, held by a wooden frame, $E^8$, fixed by angle-irons $e^7$, or by screws the heads of which are covered externally by caps, soldered on in order to prevent the atmospheric moisture from rendering the isolating layer conductive, and to prevent the heating due to the metallic conductibility. The passage of the pipes and taps through the casing is made tight by plates of india-rubber $e^2$ $e^9$, bolted by their edge onto the facing, and fixed on the pipes either by means of short tubes, tied on, as at $e^9$, or by bolting to the flanging of the tubes, as at $e^2$. The distance left between the metals should be from five to six centimeters, at least.

Figure 7:
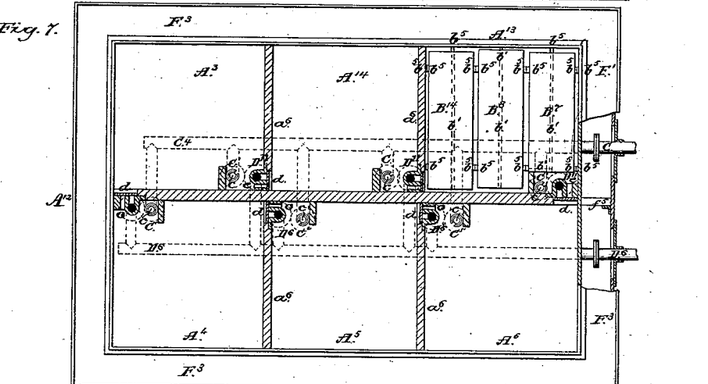

Fig. 7 represents a plan view of a freezing-refrigerator working with a positive circulation of uncongealable liquid.

The cistern $A^{12}$ is divided into six compartments, $A^{13}$ $A^{14}$ $A^3$ $A^4$ $A^5$ $A^6$, by a wooden partition, $a^6$. The refrigerating or freezing vessels $B^7$ $B^8$ $B^{12}$ are so arranged as to give a horizontal circulation. They are kept at the desired distances from the cistern and from each other by projections $b^5$, placed above and below, on their sides, on one of their ends, and on the edges and the transverse partitions of the cistern. Continuous slips $b^1$, of about one centimeter, are placed beneath and at their ends, to form a fence, without hindering the access of the refrigerating-liquid. The liquid enters by the tube $C^4$, placed beneath the cistern. It distributes itself alternately by one or other of the ascending pipes $C^1$, terminated above by taps $c$, with annular plugs opening at the side, at the height of the bath. On the other hand, the tubes $D^{11}$ communicate, by their orifices, with the exit-pipe $D^6$, and may be opened and closed by slides $d$, lateral openings $e$ putting all the compartments of the cistern in communication with each other. They are placed out of the openings of the tubes $D^{11}$, so that, on lowering the slide $d$, the orifices of the tubes may be opened and the orifice $e$ closed, and vice versa.

Supposing that the compartment $A^{13}$ has the tap $c$ open and the slide $d$ lowered, while the contrary is the case with all the other compartments, the liquid will necessarily surround the vessels $B^7$ $B^8$ $B^{14}$. It will enter into the compartment $A^{14}$ by the opening $e$, to flow around the same course and pass in the same manner through the whole of the cistern, and run out by the tube $D^{11}$ of the entrance-compartment after being gradually heated by contact with the vessels, which are proportionately cooled.

When the vessels of the compartment $A^{13}$ are sufficiently cool or frozen, they are removed and replaced by fresh ones, and the commencement of the circuit is established by the compartment $A^{14}$, and so on, to obtain a regular system of working, which will place these vessels wherein the cooling is most difficult successively in contact with the coldest liquid. The openings of the tubes $D^{11}$ are at the height of the liquid bath.

During the removal and replacement of the vessels the circulation should be stopped; and in order to obviate all inconvenience from stoppage, the pump which keeps up the circulation must be centrifugal.

A piston-pump should have a pipe-communication between its compression and suction, furnished with a spring-valve, which allows of a reflux from the former into the latter during the stoppages.

The slides are worked by means of jointed rods, which descend to the level of the cistern when they are lowered, and which return to the same level when they are raised.

The cistern is surrounded by an isolating layer like the preceding refrigerator, the junction of the sheet-iron casing with the cistern being effected by a sheet of india-rubber, $F^3$, hermetically bolted to both, and held beneath by planks resting upon bars of the internal frame $f$.

On each compartment is placed an isolating cover from ten to fifteen centimeters thick, the top of which is of sheet-iron, and the internal part is wood covered with sheet india-rubber, which is doubled over the sides and fastened hermetically to the sheet-iron tap.

The covers are fitted with hinges to the central partition of the cistern, which is raised up to their height.

The vessels $B^7$ $B^8$ $B^{14}$ hold the water to be frozen, or the meat, fish, &c., to be cooled or frozen, either dry or with the interposition of water. Their dimensions should be rather less at the bottom than at the opening, in order to facilitate the withdrawal of the matters. The apparatus shown in Fig. 8 of the drawings, intended for cooling uncongealable liquids, is placed immediately under the preceding.

Figure 8:
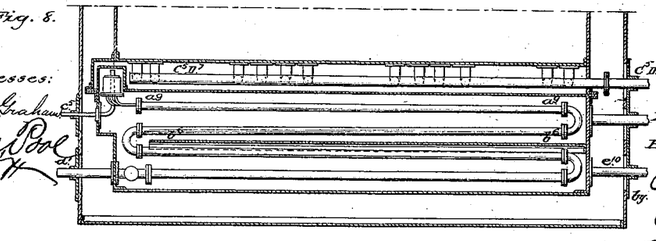

It is on the same system as the old refrigerators, from which it differs only by the absence of vessels, by a cover, $a^9$, hermetically bolted, by a horizontal partition, $b^6$, which produces a methodical cooling, and by some details of construction.

$c^5$ is the tube for carrying off the liquefied gas to the distributer. $d^1$ is the tube which leads to the absorption-vessel. $e$ is the entrance for the uncongealable liquid, which passes out at $e^{13}$.

To adapt it to this refrigerator, the congelator, Fig. 7, has a cavity beneath it, in which are placed the two pipes $C^5 D^7$, and it is placed upon the cover $a^9$.

Figure 9:
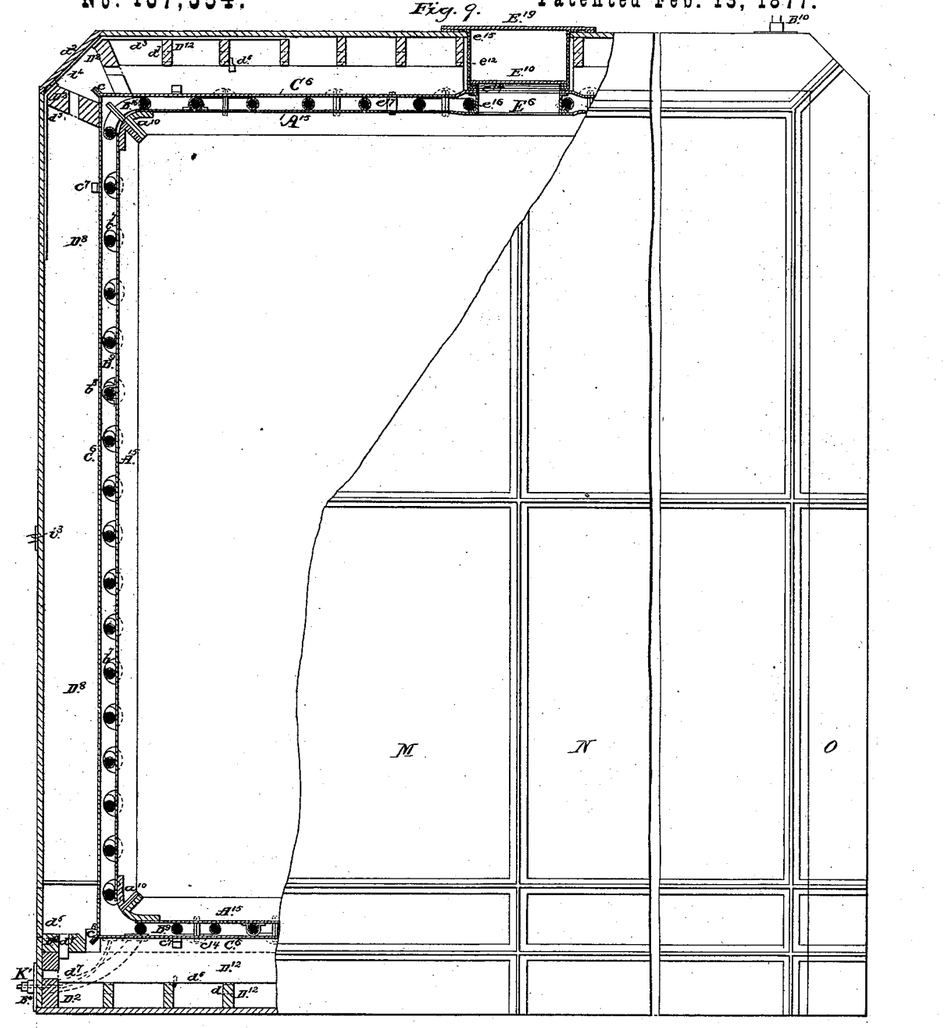

Fig. 9, Sheet 4, represents a vertical section and partial external view of an apparatus for the preservation of fresh meat and other fermentable substances.

It is formed of a galvanized sheet-iron casing, $A^{15}$, two millimeters thick, around which is coiled a serpentine, $B^9$, which expands into parallel folds above the top and beneath the bottom, and into a rectangular helix with rounded corners around the sides. The commencement of the upper serpentine is at $B^{10}$. It is joined to the latter serpentine at $B^{16}$. The latter is fastened in the same manner at the bottom of the right side to the lower serpentine, which opens to the outside at the corner $B^4$.

Each of the panels composing the casing is fastened to the others at the corners, which are provided with strong angle-irons with numerous bolts, which press the edges $A^{10}$ against bands of india-rubber pierced with holes for the bolts to pass through. The lateral serpentines are pieces of the horizontal length of the sides, which are connected at each corner by means of joints $b^7$, similar to $B^{16}$. Each of these pieces is fixed to its panel with two or three collars, similar to $b^8$, riveted onto the sheet-iron. The upper and lower serpentines are both held by the same collars. The coils are placed gradually closer together from the beginning to the end of the circuit.

A second sheet-iron casing, $C^6$, formed of panels like the first, surrounds the whole, and is joined together externally at the angles $c^8$ by joints similar to the preceding. Cavities $c^7$ allow the flanges of the upper and lower serpentines to rest therein. These panels are fastened by numerous angle-irons, $C^{14}$, to the wood-work, composed of joists $D^8 D^{12}$, connected at each end to beams $D^2$ by tenons $d^7$. The whole is surrounded by planks. The wooden casing of the beveled corners $d^2$ is fixed by screws. Bands of iron $d^3$ are placed at intervals to consolidate the said corners, and connected together by bolted rods $d^4$.

The bottom plank carries the sides from which the lower uniting tenons project, and are held by the outside beams. The covering of the corners and the part $d^5$ of the bottom should not be placed on until after the bolting of the joint $c^8$.

At the center of the tap is an elliptical opening, $E^6$, (seen on its smaller axis,) the longer axis of which should be about sixty centimeters. It is provided internally with a ring of india-rubber, $e^{12}$, folded over and bolted to the sheet-iron at $e^{14}$, and on the casing at $e^{15}$. The cover $E^{19}$ is bolted hermetically on the casing. The panel $A^{15}$ is connected by means of a joint to the angle-iron $e^{16}$, riveted on the panel $C^6$. The wood-work of the top and bottom is formed of cross-joints, tied at intervals by claws of iron $d^6$, made very short for the purpose of avoiding the conductibility; or by small bars of wood nailed to them both. The interval comprised between the wall $C^6$ and the outer casing is filled with non-conducting material. Between the movable cover $E^{10}$ and the cover $E^{19}$ is placed a bag, having the form of the opening and filled with the same material.

The top panel $A^{15}$ may be connected at intervals to the panel $C^6$ by stays $e^{17}$, riveted to the one and attached to the other by external screws, with their heads covered by soldered capsules.

To prevent the atmospheric condensation from traversing the external walls, they are clothed with impermeable materials, either with thin panels of galvanized sheet-iron, bolted externally at the corners like the panels $C^6$, but with cavities at the joints, either for sheets of india-rubber, or made with metallic bands nailed or screwed onto the joints.

Figure 10:
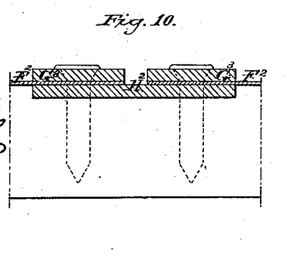

To avoid the effects of dilation, the metallic casing may be made in several pieces, M N O, as shown in the external view, and in enlarged section of the mode of junction at Fig. 10, Sheet 4. In this view, $F^2$ is the casing of metal; $G^3$, the metallic bands; $H^2$, the india-rubber bands inserted between the wood, to which the whole is screwed.

The india-rubber bands should be cemented together at the intersections, or lapped over with a bevel-joint, so as not to have a solution of continuity or of thickness. The large casings of metal are attached to the wood at intervals with screws, the heads of which rest on washers of india-rubber, or are covered with soldered capsules.

To prevent the effects of dilation in contraction of the air in these large closed vessels, small open tubes $i^3$ are placed on the external casing, with their ends upon the isolating materials. A similar one is placed on the cover $E^{19}$, the lower cover $E^{10}$ not being hermetical. The communication from the interior of the casing with the atmosphere is thereby established.

One or two tubes, $K^1$, terminated by taps, and placed at the bottom of the casing $C^6$, allow of a communication with the atmosphere to be established at the same time with the emptying of the serpentine.

It is convenient for the tubes $i^3$ to open into a receptacle containing a hygrometric agent, such as dry chloride of calcium, which will remove the humidity of the air on its passage, and for this purpose the tubes pass horizontally, and at about the middle of the height, through the wall of a cylindrical vessel of forty centimeters diameter and eighty centimeters high, reaching to the center of the vessel, and having their mouths curved downward for a length of two or three centimeters. A disk will be placed above upon projections, and with a space of two millimeters all around, and the salt will be placed in middle-sized pieces on the disk. A cover placed on the whole will have an opening of two centimeters in diameter.

All the tubes which pass through the metallic casing are connected thereto by india-rubber, as has been already explained with reference to the refrigerator, Fig. 6.

The serpentine is cooled either by the circulation of uncongealable liquid, which should pass out at least some degrees below zero, and which is forced by a centrifugal pump, passing continually from the serpentine to the refrigerator, Fig. 6, by causing the liquid gas to pass directly into $B^{10}$, where it vaporizes and passes out in a gaseous state by the tube $B^4$, and enters the absorption-vessel. Its introduction is regulated by a tap placed on $B^{10}$. For this purpose the casing should be inclined about fifteen centimeters from right to left. In order to give a slope in the direction of the circulation to the upper and lower serpentines, the lateral serpentine will be displaced in such a manner as to preserve a regular inclination from the horizontal.

This arrangement will leave some part of the casing wherein the coils are farther apart than at the front. This is obviated by soldering along the coils copper appendages of about three or four millimeters thick, which will abstract the coils between the more open coils. It will be the same for the spaces left between the branches which pass from the two sides of the opening $E^6$; or we may cause to circulate through the serpentine liquefied gases, or volatile liquids, such as sulphurous acids, and sulphuric ether, vaporized by means of pneumatic pumps, or vaporizing-injectors, of any of the systems which have been combined for producing cold. The pumps should be double, and act alternately, in order to avoid jerks in the circulation.

The section of the serpentine may be diminished nearly one-half by dividing it into two portions, the first of which stops at about half the height of the casing, with an exit-opening as at $B^4$; the second will have its entrance near the above-named exit as at the front. The partial serpentines will each have a tap to regulate the admission.

The meat to be preserved, cooled to zero for a preservation of five to six days, partially frozen for a longer preservation, and totally frozen for an indefinite preservation, is placed in the casing, previously cooled to some degrees below zero, and constantly maintained so, commencing at the middle of the bottom and piling it successively from the center to the circumference. Lattices of very thin wood or strong cloth for meat completely frozen isolates the same from the metal.

The meat is prevented from becoming a solid mass from the effects of a prolonged cooling on board ship by placing it in layers of thirty to forty centimeters on the same materials (doubled if required.) It will be better also to divide the same in a vertical direction.

Figures 11, 12, 13, 15:
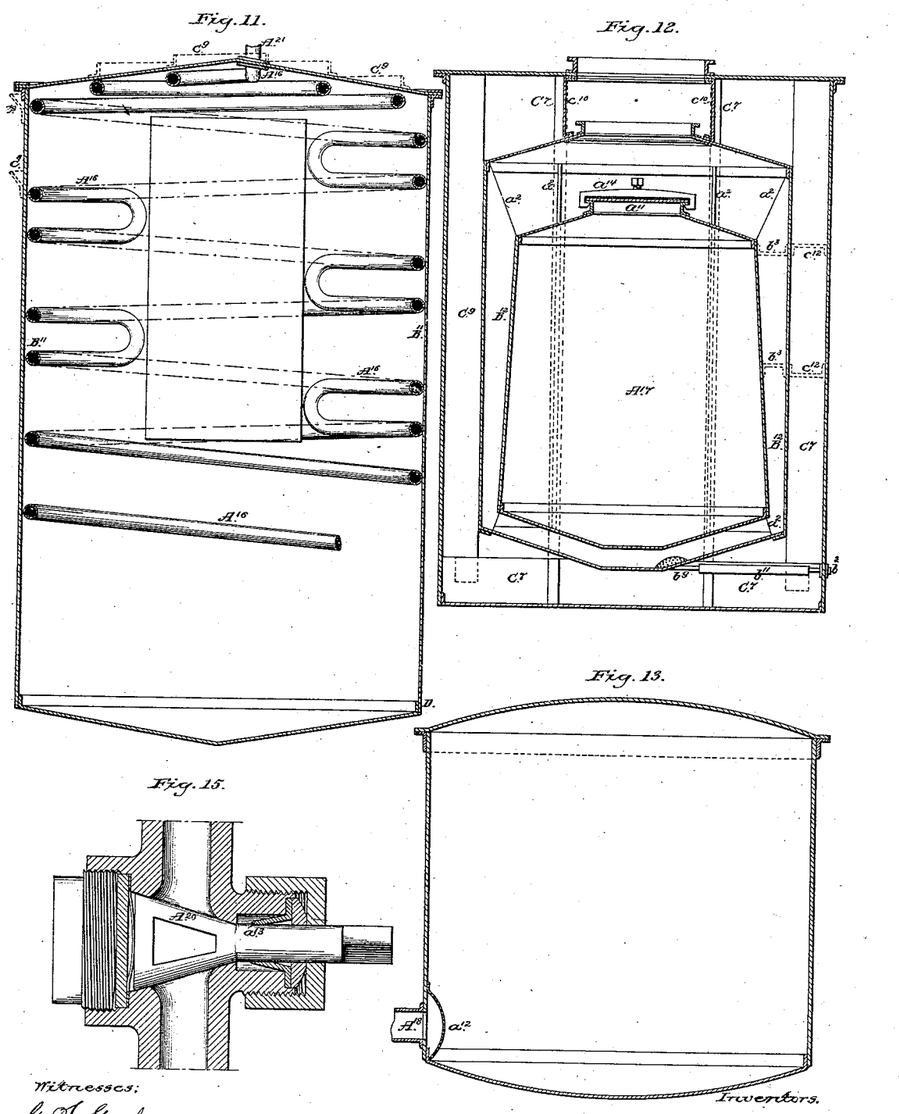

Fig. 11, Sheet 5, of the drawings represents a preserving apparatus analogous to the preceding, smaller, more simple, and provided with a lateral door. The serpentine $A^{16}$ circulates in the interior of the metallic cylinder $B^{11}$. The bottom terminates the same as the top. The dotted lines indicate the direction of the complete circuit. The upper cover of the cylinder is movable to allow of the introduction of the serpentine. The serpentine may be replaced by a gutter, $c^9$, soldered to the exterior of the cylinder, which is then riveted at the top as well as at the bottom, and describes the same circuit as the serpentine.

Near the door the partial gutters are closed at the end, and the upper ones empty themselves by tubes into those which are immediately below. The cylinder $B^{11}$ is then inclosed in a similar cylinder surrounding the gutters, with a cover bolted on and held concentrically by projections from the interior cylinder. The entrance-tube $A^{21}$ is fitted to the top of the casing, and that for exit to the bottom or point $D^9$.

Cold may be produced directly in the serpentine, as has been above explained. It is the same with the gutters. In the latter case the bottom of the cylinder and of its casing will be plain, and with stays connecting the two together, and transmitting the cold to the upper bottom, the two cylinders will be air tight. The whole is surrounded by one of the isolating casings described.

The door should be isolated and provided with elastic cushions covered with india-rubber to prevent all circulation of air in the interior. It may have in its thickness a serpentine receiving cold liquid and emitting the same by two india-rubber tubes.

Solutions of alcohol at 18° or 20° Cartier, of glycerine with thirty or forty per cent. of water, of azotate of potash and soda, saturated at the temperature to be employed, may be used to convey the cold into the apparatus without sensible injury to the matters to be preserved.

Fig. 12 of the drawings represents an apparatus for preserving meat by means of ice.

The meat, previously cooled to zero by one of the methods indicated, is placed in the sheet-iron vessel $A^{17}$, tinned inside, or better covered with tight sieves to prevent all metallic contact. Its opening is closed by a cover, $a$, pressed against a ring of india-rubber by the movable screw-clamp $a^{14}$. It is surrounded by a second casing, $B^{12}$, in galvanized sheet-iron, closing like the former, and receiving the ice in the space which separates them. Strips $a^2$, fixed to the casing $A^{17}$, keep them at the proper distance asunder. A tube, $b^9$, communicating with the outside by means of an india-rubber sleeve, $b^{11}$, to avoid conductibility, serves to draw off the water of fusion by means of a screw-plug, $b^2$. The whole is surrounded by an isolated casing, $C^7$, above described, with a ring of india-rubber, $c^{10}$, intercepting the metallic conductibility. The upper opening is closed the same as the others. A door may be placed at the side, the metallic attachment of which between the walls $A^{17}$ and $B^{12}$ is shown dotted at $b^3$. The ring of india-rubber between $B^{12}$ and $C^{12}$ is dotted at $c^1$. With this door the opening $a^{11}$ $a^{14}$ may be dispensed with, and the two others reduced to the diameter necessary for the introduction of the ice. In order that the latter may not be refrozen in the space which separates the casings $A^{17}$ and $B^{12}$, its temperature should not be below zero, and ice recently made will keep for some hours in water at zero.

Meat is preserved perfectly in this apparatus during five or six days. If it be desired to preserve it for a longer time, it must be introduced in a frozen state, and a salt must be added to the ice, which will keep the temperature always below zero.

Fig. 13 is a receiver resisting atmospheric pressure, and capable of serving to congeal meat *in vacuo*. It is filled therewith, the pieces being separated by cloths, so that the refrigerating action may attack them on all sides, and the cover is placed on a ring of india-rubber. The tube $A^{18}$ is connected to the tube $d^1$ of the refrigerator, Fig. 8, the tube $D^7$ of the same being connected to a pneumatic pump, causing a powerful vacuum, (such as are constructed by M. E. Carré, of Paris, for making ice *in vacuo*.)

The refrigerator being in action without liquid round the serpentine a vacuum is formed and maintained, and the matters are cooled or frozen, as may be desired. This operation forming a layer of ice around the serpentines, it will melt at the commencement of the following operation by intercepting for some minutes the entrance into the refrigerator of the liquefied ammonia. The water of fusion is extracted by means of a pump, the pipe of which is connected to the bottom of the refrigerator, and placed one meter below. The junction-pipes will be provided with taps which are air-tight. The cover of the receiver has a small tap to allow the air to enter before removing it.

The capacity of the pump should be one-sixteenth or one-twentieth of the space between the two receivers, with from thirty to forty strokes of the piston per minute. The rose $a$, pierced with holes, will keep free the opening of the tube A.

Figure 14:
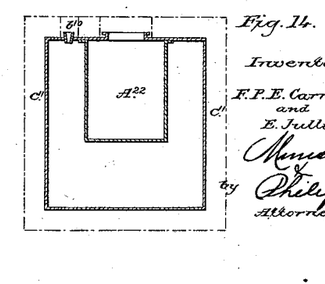

Fig. 14 is a preservative receiver of liquids, such as milk, broth, and so on. The ice is placed in the cell $A^{22}$, closed the same as the apparatus Fig. 12. The liquid is introduced by the neck $b^{10}$, closed by a stopper, and is drawn off by a tube similar to that of the same in said Fig. 12, marked $b^9$ $b^{11}$ $b^2$. $c^{11}$ is the isolating casing.

Fig. 15, Sheet 5, represents a modification of the ordinary taps. The angle of the plug $A^{20}$ being very obtuse, from thirty-three to thirty-five degrees, it cannot stick fast. The sheath of india-rubber which envelopes the rod is replaced by a recessed capsule, $a^{13}$, in soft metal, such as lead or tin, which the pressure forces against the rod. It may be hardened by two or three hundredths of antimony, according as the pressure to be borne is more or less strong. This capsule may be applied to pump and other rods.

When the isolating matters are required to be superposed to a great height, as at the sides of the casing, Fig. 9, such as are liable to subside, such as wool, flocks, &c.; they may be cemented to the walls which inclose them by quick-drying oil-varnish. Straw placed upright in bundles, placed one above the other and cut even at their ends, will not subside. Carded wool also may be surrounded by woven fabrics, in which it is held by numerous "cappadines" passing through the layer. The woven fabrics are then nailed or cemented to the walls.

The tubes which are united to the isolating casing by means of plates of india-rubber, should (in order to allow the former to pass through) be joined to their prolongations by means of conical junctions, or they should have movable flanges screwed on after the passage of the india-rubber.

Solder which will resist ammonia perfectly may be obtained by an alloy of eight parts of silver and two of zinc. The alloy of three parts of silver with two of nickel and three of zinc, although not good as the preceding, may be used.

What we claim as new, and desire to secure by Letters Patent, is—

1. The combination of the tube A, the two serpentines $a$ $a^1$, the distributer C, and the casing of the rectifier, substantially as described, and shown in Fig. 1 of the drawings.

2. The casing of the rectifier provided with the pipe D, in the exchanger of temperature, substantially as shown and described.

3. The combination of the annular perforated movable rings 2 and 4 with the perforated rings 3 and 5, and the ring 1, in the exchanger of temperature, substantially as shown and described.

4. The combination of the serpentines $f$ $f^1$ $f^2$ $f^3$ with the vessels E $E^1$ $E^2$ $E^3$, substantially as shown and described.

5. The combination of the receiver H, provided with the perforation $h^1$, with the tube $h$, substantially as shown and described.

6. The combination of the receiver H with the pipe I, serpentines I $I^2$, and exit-pipe J, substantially as shown and described.

7. The combination of the serpentine $A^2$, annular closed vessel $B^{13}$, and internal appendage $B^3$ of the liquefier, substantially as described, and shown in Fig. 3 of the drawings.

8. The combination of the tubes C $C^1$, placed at an angle to the radius of the vessel B, substantially as shown and described.

9. The flange $a^7$, constructed so as to be secured to the vessel $B^{13}$, and to support the flange of the tube for the admission of the gas, substantially as shown and described.

10. The combination of the tubes $e^6$, diaphragms $l$, and partition F of the absorption-vessel, substantially as described, and shown in Fig. 3 of the drawings.

11. The combination of the small disk $g$ with tube G, to break up the current and regulate the circulation, substantially as shown and described.

12. The combination of the perforated tube I with the absorption-vessel, substantially as described.

13. The combination of the casing $E^5$, wooden frame $E^8$, serpentines 11 12 13 41 51 6, distributer $A^{11}$, tubes $a^5$, and collector $B^6$, of the refrigerator, substantially as described, and shown in Fig. 6.

14. The tap provided with a plug, $A^{20}$, and the recessed capsule $a^{13}$, of soft metal, substantially as described, and shown in in Fig. 15 of the drawings.

In testimony whereof we have signed our names to this specification in the presence of two subscribing witnesses.

FERDINAND PHILIPPE EDOUARD CARRÉ.
EDOUARD JULLIEN.

Witnesses:
 AUGUSTE CHÉRUT,
 ROBT. M. HOOPER.